March 6, 1956 — J. S. HAMLON — 2,737,312

CONTAINER

Filed Feb. 21, 1951

INVENTOR
John S. Hamlon
BY Robert M. Dunning
ATTORNEY 2,737,312

CONTAINER

John S. Hamlon, Fergus Falls, Minn.

Application February 21, 1951, Serial No. 212,139

1 Claim. (Cl. 220—38.5)

This invention relates generally to containers and pertains more particularly to a container having a readily displaceable cover.

One important object of my invention is to provide a container having a cover that may be manipulated by the same hand in which the container itself is held.

Another object of my invention is to provide a container with a cover which will result in prompt closing of the cover after removal of a portion of the container's contents.

A further feature of the invention resides in the production of a dust and moisture resisting container.

Another feature of the invention is that the container is easily cleaned and refilled.

A still further object is the provision of a container, the contents of which will not spill when dropped.

Other objects of the invention are to produce a container which is inexpensive to manufacture, not easily damaged, readily repaired, and having parts which can be cheaply and easily replaced.

Still other advantages of this invention will be apparent from the following description taken in connection with the drawing forming a part of the specification, and in which.

Figure 1:
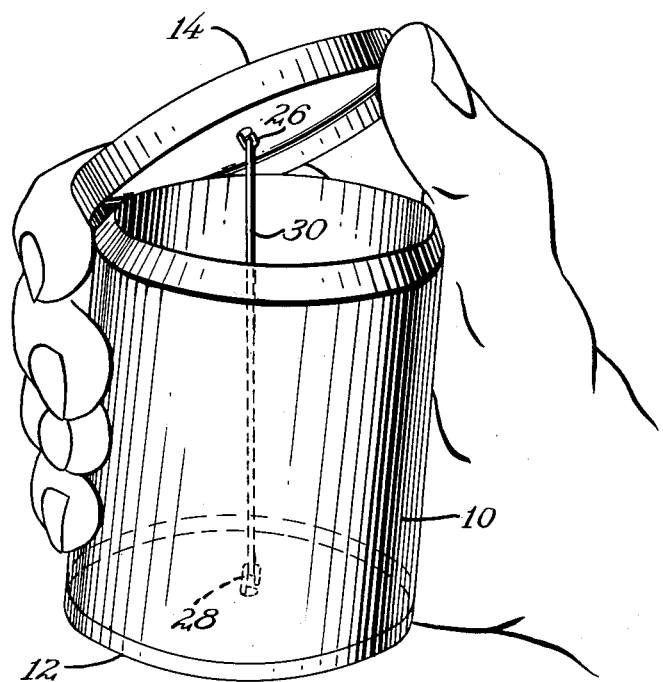
Figure 1 is a pictorial view of the container with the cover tilted into an open position.

Referring now to the drawing it will be seen that the container includes a side wall 10, shown in the shape of a cylinder, a bottom wall 12 and a removable top wall or cover 14. These parts may be of plastic, metal or other suitable material, the employment of any particular material being governed principally by the intended use of the container. For example, the utilization of a transparent plastic material would permit easy identification of the container's contents, and would of course greatly facilitate the taking of inventory, the exact quantity of matter remaining in the container always being visible. The utilization of a transparent cover also results in the perception of the contents during the act of pouring or dispensing, for the container can be accurately tipped to the extent necessary for the removal of only the amount desired, the cover serving to restrict the bulk of the contents, pills or capsules for example, to the confines of the container without interference to vision.

Although the bottom wall 12 has been depicted as a separate element, it will be understood that this element may, if desired, be fabricated integrally with the side wall 10 and that the container may assume other shapes than that illustrated.

The top cover 14 is provided with a groove 16 in which is received a gasket 18. Circumjacent the gasket 18 is a depending portion 20 which may form an integral part of the cover 14. The depending portion 20 is beveled at 22.

Figure 2:
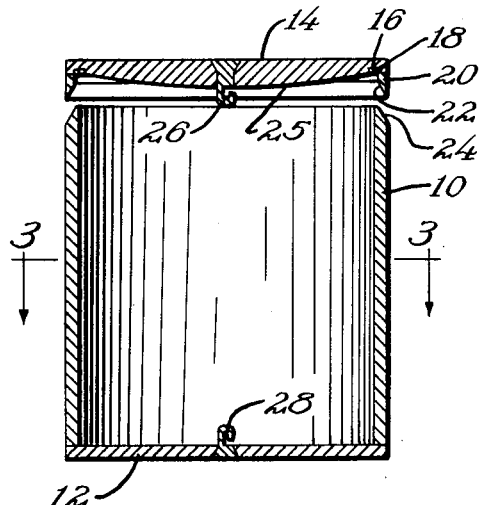
Figure 2 is a central elevational view in section, the cover being illustrated in a slightly raised position.
Figure 3:
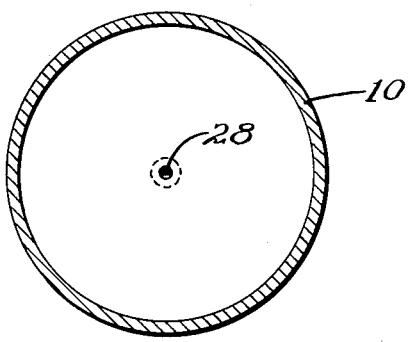
Figure 3 is a sectional view taken in the direction of the line 3—3 of Figure 2.

A complemental bevel 24 is provided at the upper edge of the side wall 10, and it will be understood that the two beveled surfaces 22 and 24 cooperate to facilitate proper alignment of the cover 14 with the side wall 10. From Figure 2 it will be seen that the underside of the cover 14 is of convex configuration as designated by the reference numeral 25. This forms a sloping or curved surface which rides freely on the apex of the bevel 24 during displacement of the cover 14 and assists in returning the cover to its closed position, the two beveled surfaces 22 and 24 assuring proper alignment with the side wall 10 as above mentioned. The container is preferably designed so that the gasket 18 will rest upon the apex of the bevel 24 when the cover is in closed position, thus forming a sealing relationship between the cover and side wall.

A hook member 26 is carried on the underneath side of the cover 14 and a second hook member 28 is carried by the bottom wall 12. These hook members may assume the shape of tapered plugs passing through the top and bottom walls; they may be fastened solely upon the interior surfaces; or they may be integral parts of the top and bottom walls. The location of the hooks near the center of the top and bottom walls results in the cover being easily opened and closed without the user being concerned with the relative positioning of any part of the container, as would be the case where the hooks are offset from the center.

Engaging the hooks 26 and 28 is a rubber band 30, which when in a slightly stretched condition will produce a yielding force pulling or biasing the cover 14 into closed position.

In use, the container can be conveniently held in one hand, as shown in Figure 1 of the drawings, and the cover 14 may be readily tilted into a raised position by the thumb of the same hand. Upon release of the cover, it readily snaps or returns to its closed position by virtue of the biasing force exerted by the rubber band 30. As before mentioned, the beveled edges 22 and 24 assure proper alignment of the cover with the top wall.

It will be apparent from the foregoing descrcription that my container possesses considerable utility where a person must be able to grasp the container in one hand and at the same time open and close the cover with the same hand, keeping the other hand free for other purposes.

My invention will find particular utility in medical and dental work where the nurse or doctor must of necessity keep one hand free for administering purposes, while being able to obtain supplies and medicine with the other hand. In such instances the self sealing of the container upon release of opening pressure will assure the preservation of the container's contents without contamination.

It is to be understood, however, that even there is herein shown and described a preferred embodiment of the invention, the same is susceptible to certain changes fully comprehended by the spirit of the invention as herein described and within the scope of the appended claim.

I claim:

A self-closing and self-sealing container for single handed operation, the container including an open topped substantially cylindrical container body having a closed bottom, a cover having a downturned marginal flange thereon, replaceable resilient biasing means connecting the center of said cover to the center of said bottom, and cooperative surfaces on said cover and on said body operable to return said cover into container body closing position after it has been moved into open position, the surfaces including an exteriorly bevelled edge at the upper extremity of said container body, an interiorly bevelled edge on the lower extremity of said down turned flange on said cover, said bevelled edges engaging in substantial surface contact when said cover is in place, and a convex under surface on said cover, said convex surface and said bevelled surfaces cooperating to slide the cover into closed position as soon as a force holding said cover open is released.

References Cited in the file of this patent

UNITED STATES PATENTS

| | | |
|---|---|---|
| 356,524 | Clement | Jan. 25, 1887 |
| 440,147 | Fox | Nov. 11, 1890 |
| 1,122,623 | McNutt | Dec. 29, 1914 |
| 1,141,625 | Gardner | June 1, 1915 |
| 1,393,815 | Nowack | Oct. 18, 1921 |
| 2,349,985 | Page | May 30, 1944 |
| 2,385,364 | Larson | Sept. 25, 1945 |

FOREIGN PATENTS

| | | |
|---|---|---|
| 521,845 | France | Mar. 16, 1921 |